United States Patent

[11] 3,607,644

| [72] | Inventors | Alberto Agazzi<br>Bergamo, Italy;<br>Armando Broggi, Santa Fe, Argentina;<br>Sergio Galli De Paratesi, Varese, Italy;<br>Luciano Ghiurghi, Varese, Italy |
|---|---|---|
| [21] | Appl. No. | 764,413 |
| [22] | Filed | Oct. 2, 1968 |
| [45] | Patented | Sept. 21, 1971 |
| [73] | Assignee | European Atomic Energy Community (Euratom)<br>Brussels, Belgium |
| [32] | Priority | Oct. 26, 1967 |
| [33] | | Belgium |
| [31] | | 50095 |

[54] LIQUID-SAFETY-ROD SYSTEM WITH A FLEXIBLE DIAPHRAGM ACCUMULATOR
9 Claims, 3 Drawing Figs.

| [52] | U.S. Cl. | 176/86 |
|---|---|---|
| [51] | Int. Cl. | G21c 7/22 |
| [50] | Field of Search | 176/20, 86 |

[56] References Cited
UNITED STATES PATENTS

| 3,261,755 | 7/1966 | Mostert | 176/22 |
|---|---|---|---|
| 3,331,745 | 7/1967 | Hennig | 176/22 |
| 3,414,476 | 12/1968 | Galli de Paratesi et al. | 176/22 X |

FOREIGN PATENTS

| 921,447 | 3/1963 | Great Britain | 176/22 |

*Primary Examiner*—Carl D. Quarforth
*Assistant Examiner*—Harvey E. Behrend
*Attorney*—Stevens, Davis, Miller & Mosher

ABSTRACT: A liquid-safety-rod system for nuclear reactors comprising a lower poison-solution reservoir, a poison-solution accumulator containing a flexible diaphragm connected therewith, a source of high-pressure gas to force the poison solution out of the accumulator into a connecting collector and thence into tubes extending through the reactor core and a washing circuit comprising a washing-liquid reservoir, a washing-residue reservoir and a pump connected to said tubes.

LIQUID-SAFETY-ROD SYSTEM WITH A FLEXIBLE DIAPHRAGM ACCUMULATOR

The invention relates to a liquid-safety-rod system for a nuclear reactor in which poison solution is, in case of an alarm, injected rapidly into the rods by one or several hydropneumatic diaphragm accumulators.

In its broad form the invention provides a liquid-safety-rod system for a nuclear reactor comprising upwardly extending tubes passing through the reactor core and connected at their lower ends to one or more lower collectors or headers, a lower reservoir for neutron poison solution below the level of the lower collector, a poison-solution accumulator with a flexible diaphragm dividing the accumulator into first and second chambers, the second chamber for poison solution and the first chamber being connected through a control valve to a source of high-pressure driving gas, an overflow accumulator having an overflow discharge pipe at a level just below the lower ends of the tubes to determine the normal operating level of the poison solution, said discharge pipe leading to the lower reservoir which is at a level below that of the overflow reservoir, said second chamber and said overflow reservoir at a position below the overflow pipe, being connected to the lower collector, or collectors, there being a valve to isolate the overflow reservoir from the second chamber and from the collector and a pump with pipe connections for pumping poison solution from the lower reservoir to the second chamber.

More specifically the invention provides a system of liquid safety rods for a nuclear reactor provided with tubes passing through the core of the reactor from bottom to top, issuing from a lower collector or collectors and terminating in an upper collector, a washing circuit comprising a washing-liquid reservoir, a washing-residue reservoir and a pump, and a poison-solution circuit comprising a solution reservoir and a pump, characterized by: a poison-solution accumulator with a diaphragm having at the bottom a chamber containing the poison solution, and an overflow accumulator situated below the level of the reactor core and each connected to the lower collector or collectors, the overflow accumulator having a discharge pipe issuing from a level just below that of the inlet of the rods in the reactor core and terminating in the poison-solution reservoir which is situated lower than the discharge pipe, the gas chamber of the diaphragm accumulator being connected by means of valves either to an intake of high-pressure driving gas or to a reference low pressure, to which are connected the atmospheres of the other reservoirs, of the overflow accumulator and the upper collector.

In a preferred form of the invention the system has a poison-solution circuit for the emergency introduction (or an alarm signal) of the solution into the reactor core and then, where required, a circulation of the solution, for example if it would tend to heat and become decomposed in the core.

The washing circuit may be arranged for washing some rods while others, in sufficient number, remain available for a reactor shutdown. This circuit also has in known manner a washing-liquid reservoir, a washing-residue reservoir and a pump. An also-known system (for example a penetrating-rod-type upper collector) enables some rods to be washed during the operation of the reactor.

The system according to the invention may also have a diaphragm accumulator with a liquid chamber in the form of a part-spherical bowl and a gas chamber of as small a volume as possible, but nevertheless permitting uniform distribution of the pressure of the driving gas over the diaphragm, ribs situated in the gas chamber ensuring the reproducibility of the position of the diaphragm and therefore of the charged volume, and the diaphragm having reinforcement at its center to make it rigid.

Some examples of the invention will now be described with reference to the accompanying drawings in which.

Figure 1:
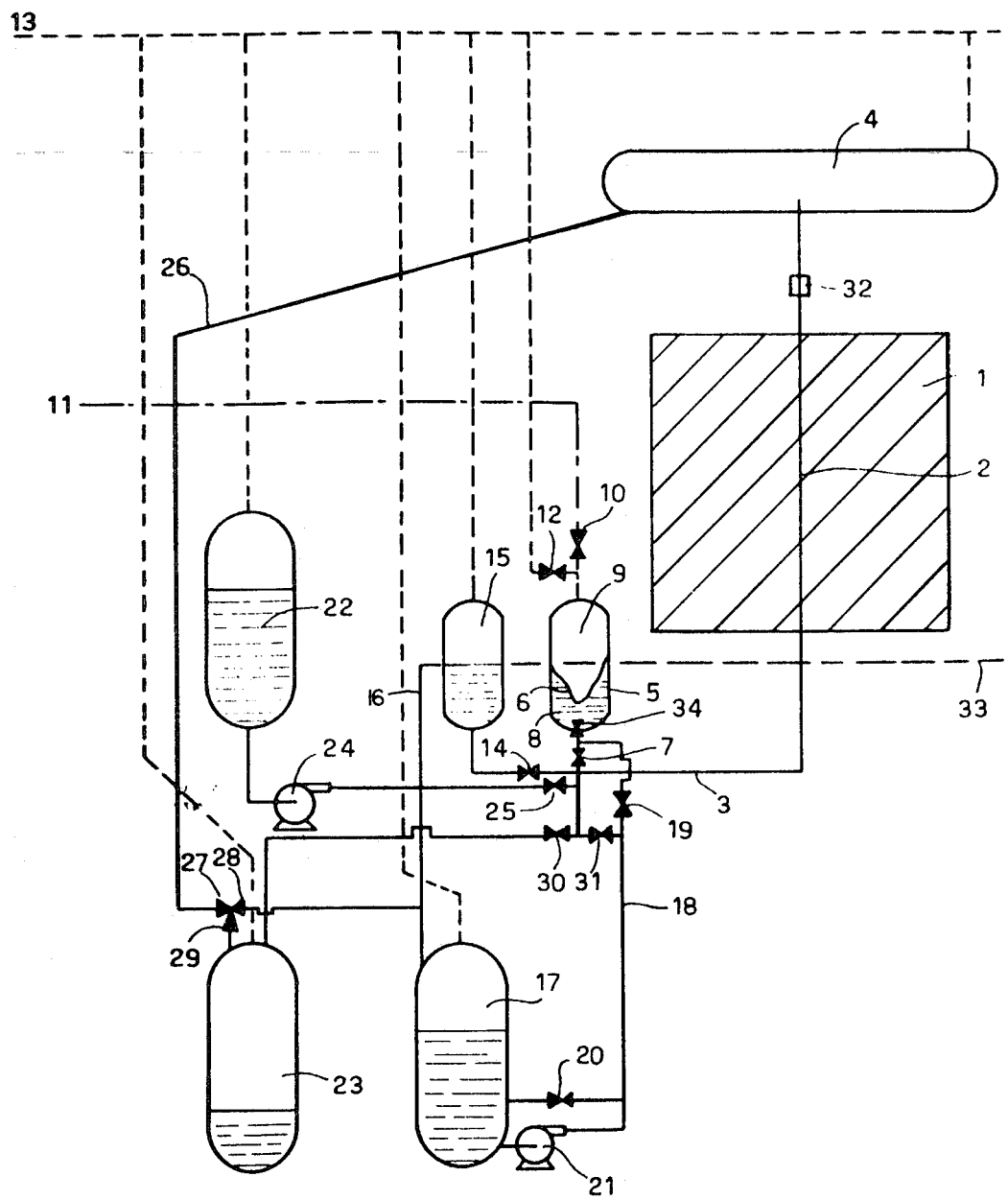
FIG. 1 is a diagram of a form of the invention with a hydropneumatic diaphragm accumulator of conventional type.

With reference to FIG. 1, the core 1 of the reactor is passed through from bottom to top by hollow tubes, which may contain the neutron poison, i.e. by the liquid safety rods, of which only one tube 2 is shown. These tubes 2 are connected below the level of the core 1 to one or several lower collectors or headers 3 (only one has been shown) and, above the core, to an upper collector or header 4, for example of the penetrating-rod type.

The lower collector 3 is connected to the liquid chamber 8 of a hydropneumatic accumulator 5 with a diaphragm 6 through a quick-acting valve 7. A valve 34, which may be closed by the contact of the diaphragm, may also be provided at the outlet of the chamber 8. The accumulator is disposed with the liquid chamber 8 below the gas chamber 9. The chamber 9 is connected through a valve 10 to a source 11 of pressure driving gas, and through valve 12 to a reference low pressure 13.

The collector 3 is connected through a valve 14 to an overflow reservoir 15 with a discharge pipe 16 terminating in a poison-solution reservoir 17. The opening of the pipe 16 into the reservoir 15 is at a level just below that of the entry of the rods 2 below the reactor core. The chamber 8 is connected to the reservoir 17 by a pipe 18 starting between the chamber 8 and the valve 7, and having a valve 19. This pipe 18 terminates in the reservoir 17, either through a valve 20 or through a pump 21. The reproducibility of the volume of the chamber 8 is ensured by controlling the pressure in the chamber 9.

The washing circuit has a washing-liquid reservoir 22 and a washing-residue reservoir 23. The reservoir 22 is connected to the lower collector 3 through a pump 24 and a valve 25. The upper collector 4 is connected, by means of its discharge pipe 26 and a three-way valve 27, 28, 29, to the reservoir 23 (ways 27, 29). The lower collector 3 is connected to the reservoir 23 through valve 30 and to the reservoir 17 through a valve 31 and pipe 18.

The atmosphere of all the reservoirs and of the overflow accumulator are connected to the reference low pressure 13, and means 32 for the hydrodynamic braking of the solution may be disposed between the core 1 and the upper collector 4.

During the normal operation of the reactor all the valves are closed except that valve which is closed by the membrane (i.e. valve 34). The chamber 8 of the accumulator and rods 2 up to the level 33 have beforehand been filled with poison solution and the chamber 9 with driving gas from the source 11, which supplies this driving gas at a pressure depending on the velocity necessary for the injection of the poison solution into the rods.

On an alarm signal, all that is necessary is to open the valve 7. The diaphragm 6 is caused by the driving gas to force the solution rapidly into the rods, and when it attains its maximum expansion it closes the valve 34. The poison solution then stops in the rods. If, after this emergency introduction, circulation of the poison solution is necessary, all that is necessary is to open the valve 19, start the pump 21 and open the valve 27, 28, 29 in the directions 27, 28.

This will pump the solution through the valves 19 and 7, the rods, the upper collector, the valve 27, 28, 29 in the directions 27, 28 and back to its reservoir 17.

To recharge the accumulator 5 and prepare it for a fresh introduction, it is normally only necessary to recharge it with liquid, there being no loss of gas. It is only necessary to reclose the valve 7 and open the valve 19, all the other valves being closed.

The pump 21 is then started and reinjects solution into the accumulator 5. If for any reason (for example repairs) the chamber 9 is depressurized, then, before recharging the accumulator with liquid, it must be recharged with gas at the required pressure, i.e. the pressure normally present there after an emergency introduction of the rods.

The liquid introduced into the rods is emptied by merely opening the valve 14. The solution descends again by gravity into the overflow accumulator 15 and through the pipe 16 into its reservoir 17, the way 28 of the valve 27, 28, 29 being closed. The level in the rods is therefore stabilized at 33 by a communicating-vessel effect.

To wash the tubes 2, the valves 31 and 20 must first be opened and all the others must be kept shut, enabling the pipes to be emptied and the solution to be recovered in its reservoir 17. The valves 31 and 20 must then be closed again, the valve 25 must be opened, the valve 27, 28, 29 must be opened in the direction 27, 29 and the pump 24 must be started. The washing liquid issuing from the reservoir 22 flows through the lower collector, the rods, and the upper collector, and terminates its journey in the washing-residue reservoir 23. After washing, the valve 25 is closed again and the valve 30 is opened, so that the washing liquid remaining in the tubes 2 may also be discharged.

To fill the rods with poison solution again up to the level 33, the pump 21 must be started after the valves 14 and 31 alone have been opened. When the level 33 has been reached, all the valves must be closed again, and the system is ready for a fresh emergency introduction.

In the system described above, the valve 7 initiating the emergency introduction of the liquid rods into the reactor core operates on the solution. In some cases, this may not ensure rapid functioning, for example when the solution tends to cause deposits or incrustations. Problems may also arise because of the high precompression pressures necessary for the desired performance. It is not a very satisfactory solution to use a conventional diaphragm accumulator charged only with liquid with the diaphragm slackened and with injection of gas at high pressure when an alarm signal is given.

On the sudden insertion of the rods, the arrival of high-pressure driving gas would cause irregular tension of the membrane, in which liquid pockets might be imprisoned, causing in the diaphragm considerable local tension, which might easily break it.

Figure 2:
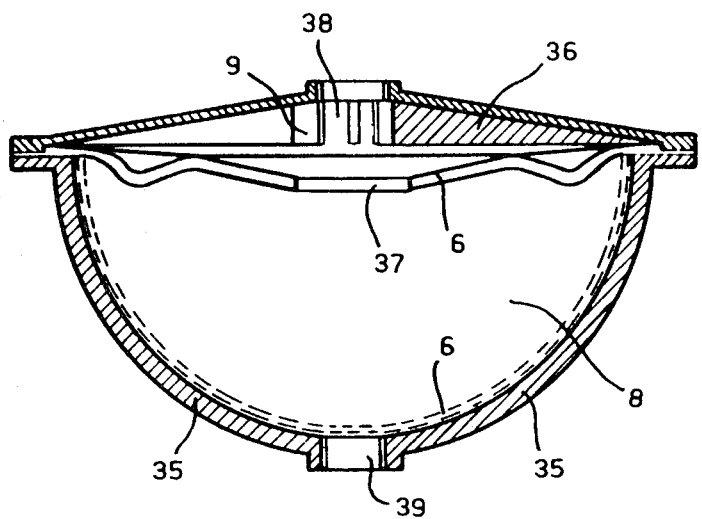
FIG. 2 is a section through a hydropneumatic diaphragm accumulator of an improved type.

Among the various systems for obviating the disadvantages mentioned above, accumulators may be used, either of the known transfer-barrier type or a new type of accumulator described with reference to FIG. 2.

A lower wall 35 of its liquid chamber 8 is in the form of a part-spherical bowl causing the weight/volume ratio to be reduced to the minimum.

Ribs 36 at the top of the accumulator act as upper abutments for the diaphragm 6 when the volume of the liquid chamber is brought to the maximum (accumulator charged with liquid). These ribs 36 ensure in these conditions the reproducibility of the volume of the chamber 8, i.e. of the liquid to be injected. The dimensions of the membrane 6 are such that, even in the lower position (accumulator empty), it is never strained.

The central part of the diaphragm has a reinforcement 37 for preventing the diaphragm from being deformed at the center like a bag, under the pressure of the driving gas issuing from the supply orifice 38, causing the diaphragm to tear. The gas chamber 9 with the diaphragm in its top position, is made as small as is practicable. Thus, in the case of an alert, the inevitable idle time between the opening of the valve for the supply of high-pressure gas and the time when the diaphragm begins to force in the poison solution is reduced to a minimum. It must be mentioned, however, that the minimum volume of the chamber 9 must be compatible with the need to have a pressure uniformly distributed over the diaphragm.

Figure 3:
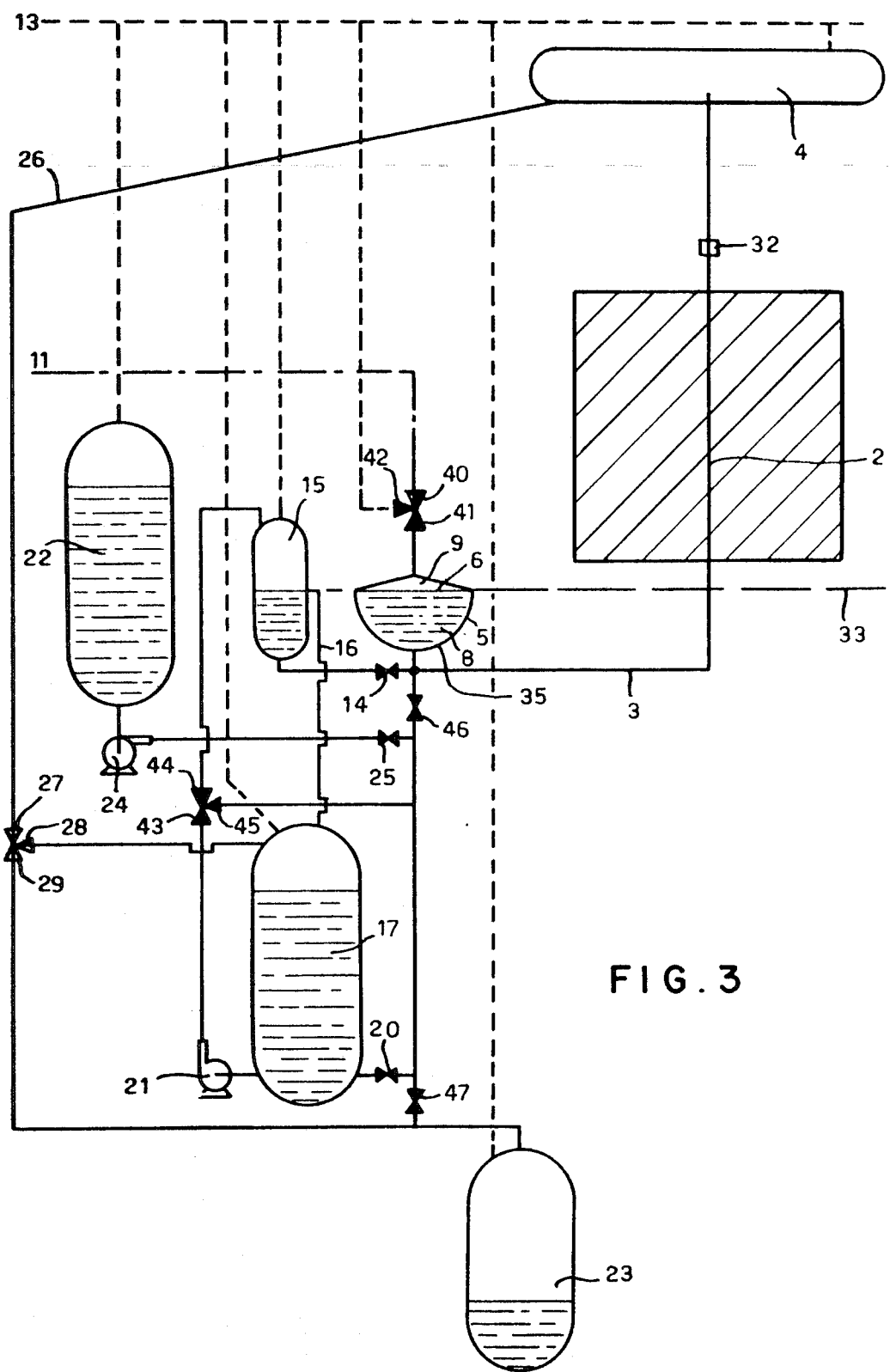
FIG. 3 is a diagram of a form of the invention with the hydropneumatic accumulator shown in FIG. 2.

A system of liquid safety rods according to the invention with the use of the improved hydropneumatic accumulator described above will now be described with reference to FIG. 3, in which the elements similar to those of FIG. 1 have been indicated by the same reference numerals.

The chamber 9 of the accumulator 5 is connected by means of a three-way valve 40, 41, 42, either to the high-pressure 11 (ways 40, 41) or to the reference low-pressure 13 (ways 42, 41). The piping and valves connecting the various reservoirs, accumulators and collectors are connected according to a scheme that is a variant of the one according to FIG. 1. It comprises the three-way valve 43, 44, 45 and the valves 46 and 47. There is no valve 34. The diaphragm 6 is preferable secured at the level 33. This level thus defines the highest position of the diaphragm.

During the normal operation of the reactor, all the valves are closed except the valve 40, 41, 42 which is open in the directions 42, 41. On an alarm signal, the valve 40, 41, 42 is opened in the directions 40, 41. The driving gas forces back the diaphragm, which ejects the solution towards the rods and, when all the solution has been ejected, is applied completely against the wall 35.

To extract the rods, the valve 40, 41, 42 must be reopened in the directions 42, 41, the high-pressure driving gas then being discharged towards the low-pressure 13. The diaphragm being flexible, the solution is able to enter the accumulator 5 again by gravity from the tube 2, causing the diaphragm to bear on the ribs 36 again. The chamber has again reached its maximum volume, and the system is ready for a fresh introduction.

To empty the rods, the valves 46 and 20 must be opened. The solution will descend again by gravity into its reservoir 17. This operation may be necessary either for the maintenance of the diaphragm accumulator or to prepare for the washing of the rods. The latter operation is carried out by opening the valves 25 and 46 and 27, 28, 29 in the directions 27, 29 and starting the pump 24.

The operations for emptying the washing liquid and for recharging and resetting the accumulator and the rods are carried out in as simple a manner. It is also easy to see how to effect the flow of poison solution.

The invention is not limited to the few embodiments that have just been described, but includes any variants. Thus, without going beyond the scope of the invention, a whole series of connections may be provided between the accumulator or accumulators 5 and the lower collector or collectors 3, whose connections with the rods 2 may if desired be provided with individual valves, the sole condition being that a sufficient number of rods 2 and accumulators 5 must always be able to be kept in reserve for an emergency introduction of the rods, even during the washing of a certain number of other rods. Similarly, the upper collectors may be more than one in number, whether or not they are of the penetrating-rod type, provided that the above condition is observed.

We claim:

1. A liquid-safety-rod system for a nuclear reactor having a core comprising upwardly extending tubes passing through said core and connected at their lower ends to at least one lower collector, a lower reservoir for neutron poison solution below the level of said lower collector, a poison-solution accumulator with a flexible diaphragm dividing said accumulator into first and second chambers, said second chamber for poison solution and said first chamber being connected through a control valve to a source of high-pressure driving gas, an overflow accumulator having an overflow discharge pipe at a level just below the lower ends of said tubes to determine the normal operating level of the poison solution, said discharge pipe leading to said lower reservoir which is at a level below that of said overflow reservoir, said second chamber and said overflow reservoir, at a position below said overflow discharge pipe, being connected to said lower collector, there being a valve to isolate said overflow reservoir from said second chamber and from said lower collector and a pump with pipe connections for pumping poison solution from said lower reservoir to said second chamber.

2. A liquid-safety-rod system as claimed in claim 1, in which the upper ends of said tubes are connected to at least one upper collector.

3. A liquid-safety-rod system as claimed in claim 1, in which the upper ends of said tubes, said overflow accumulator, said lower reservoir and said first chamber are all connected to a reference low gaseous pressure, there being an isolating valve in the connection from said first chamber.

4. A system of liquid safety rods for a nuclear reactor having a core comprising tubes passing through said core from bottom to top, issuing from at least one lower collector and terminating in at least one upper collector, a washing circuit comprising a washing-liquid reservoir, a washing-residue reservoir and a pump, said washing-liquid reservoir being connected to said lower collector through said pump and connecting pipes, and said washing-residue reservoir being connected to said upper collector by valved pipe means, and a poison-solution circuit comprising a poison-solution reservoir and a pump, connected by conduit means to a poison-solution accumulator with a diaphragm, having at the bottom of said accumulator a chamber containing the poison solution, and an overflow reservoir situated below the level of the reactor core, each said poison-solution accumulator and said overflow reservoir being connected to said lower collector, said overflow reservoir having a discharge pipe issuing from a level just below that of the inlet of the rods in the reactor core and terminating in said poison-solution reservoir which is situated lower than the connection of said overflow reservoir and said discharge pipe, said poison-solution accumulator having a gas chamber above said diaphragm connected by means of valves either to an intake of high-pressure driving gas or to a reference low pressure, said reference low pressure also being connected to said washing-liquid reservoir, said washing-residue reservoir, said poison-solution reservoir, said overflow reservoir and said upper collector.

5. A system as claimed in claim 4, wherein said poison-solution chamber of said diaphragm accumulator is connected by a quick-acting valve to said lower collector, said overflow reservoir also being connected to said lower collector by valve means.

6. A system as claimed in claim 4, wherein the gas chamber of said diaphragm accumulator is connected either to high pressure or to said reference low pressure by means of a quick-acting three-way valve, the lower collector being connected by means of a valve to the overflow reservoir and to the liquid chamber of said diaphragm accumulator without intermediate means.

7. A system as claimed in claim 4, wherein said diaphragm accumulator has a liquid chamber in the form of a part-spherical bowl and a gas chamber so constructed that the pressure of the driving gas is distributed uniformly over the diaphragm, and having means for ensuring the reproducibility of the position of the diaphragm and therefore of the volume of poison solution, and wherein the center of the diaphragm has reinforcement means, which limits its deformation.

8. A system as claimed in claim 7, wherein said means for ensuring the reproducibility of the diaphragm position are ribs disposed on the interior surface of said gas chamber.

9. A system as claimed in claim 4, wherein said diaphragm accumulator is disposed such that said diaphragm is substantially at the level of said discharge pipe when said liquid chamber is full of poison solution.